Nov. 11, 1958

A. STOLL 2,859,459

APPARATUS FOR MAKING SELF-LOCKING NUTS HAVING
RADIALLY DEFORMED THREAD PORTIONS

Filed Dec. 27, 1954

INVENTOR.
Albert Stoll
BY
Harness, Dickey & Pierce.
ATTORNEYS.

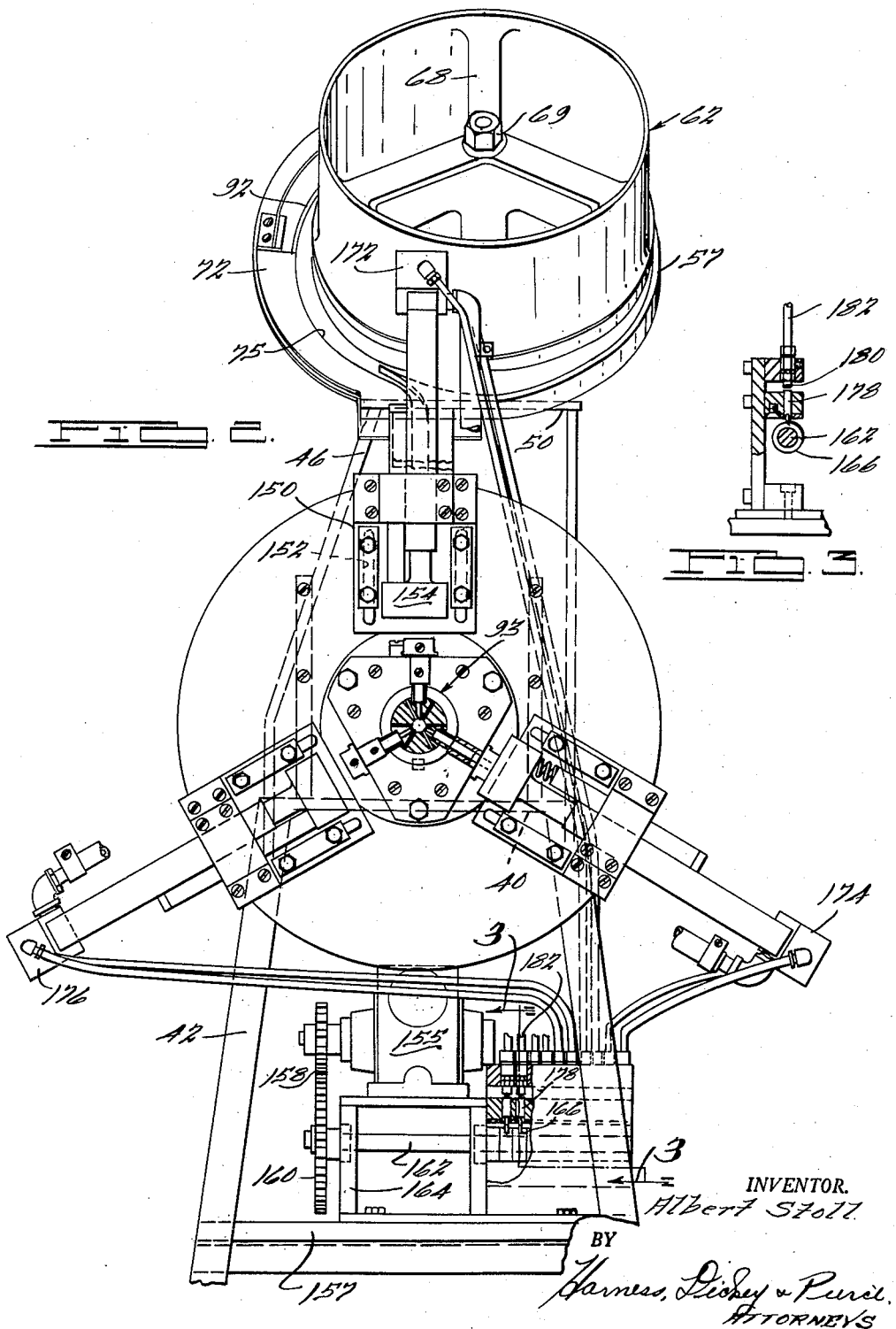

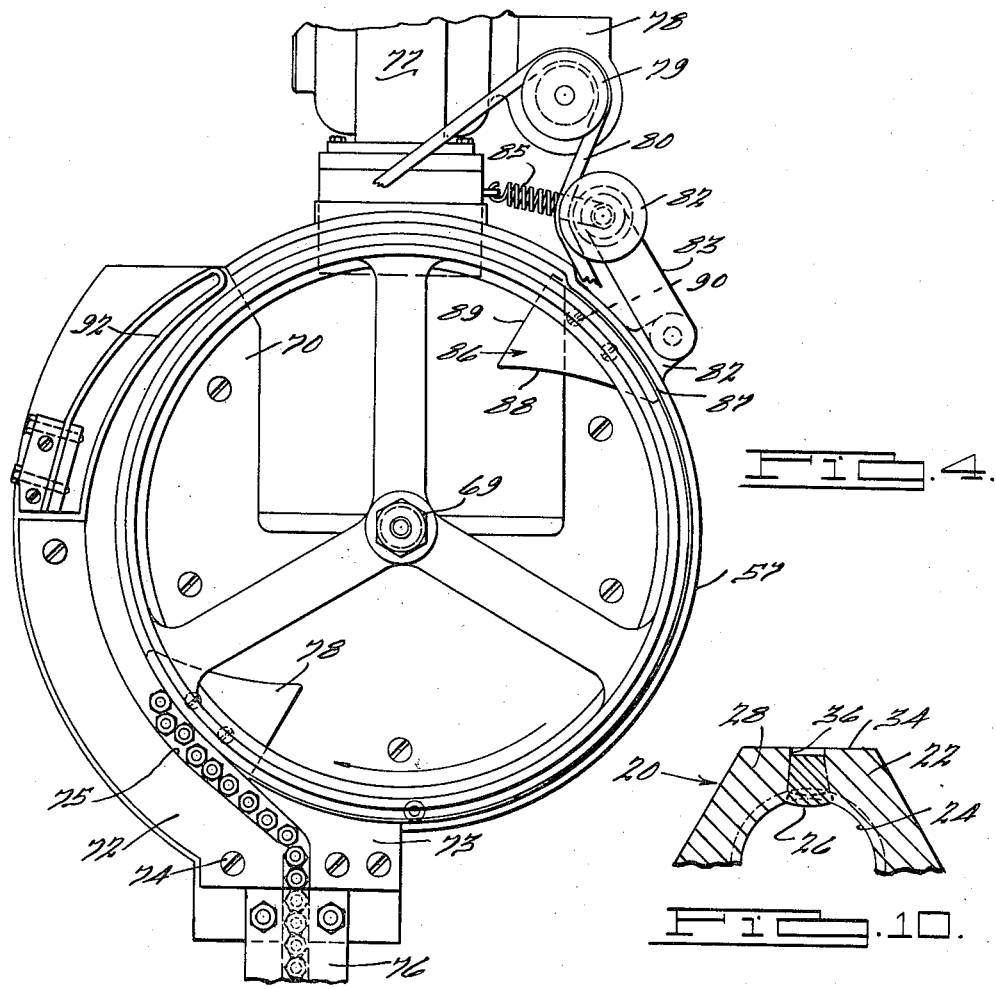

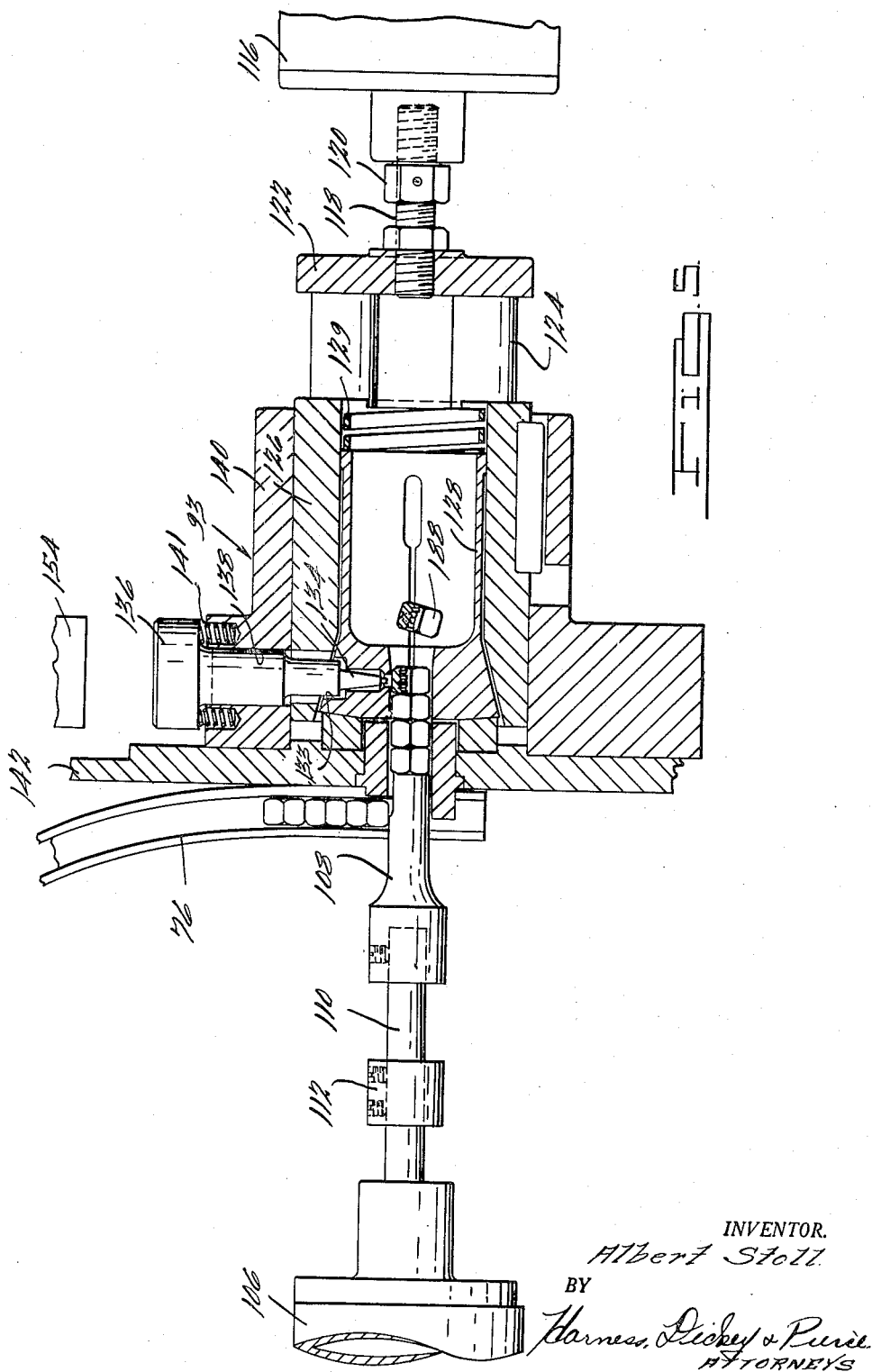

Nov. 11, 1958 A. STOLL 2,859,459
APPARATUS FOR MAKING SELF-LOCKING NUTS HAVING
RADIALLY DEFORMED THREAD PORTIONS
Filed Dec. 27, 1954 6 Sheets-Sheet 5

INVENTOR.
Albert Stoll
BY
Harness, Dickey & Pierce.
ATTORNEYS

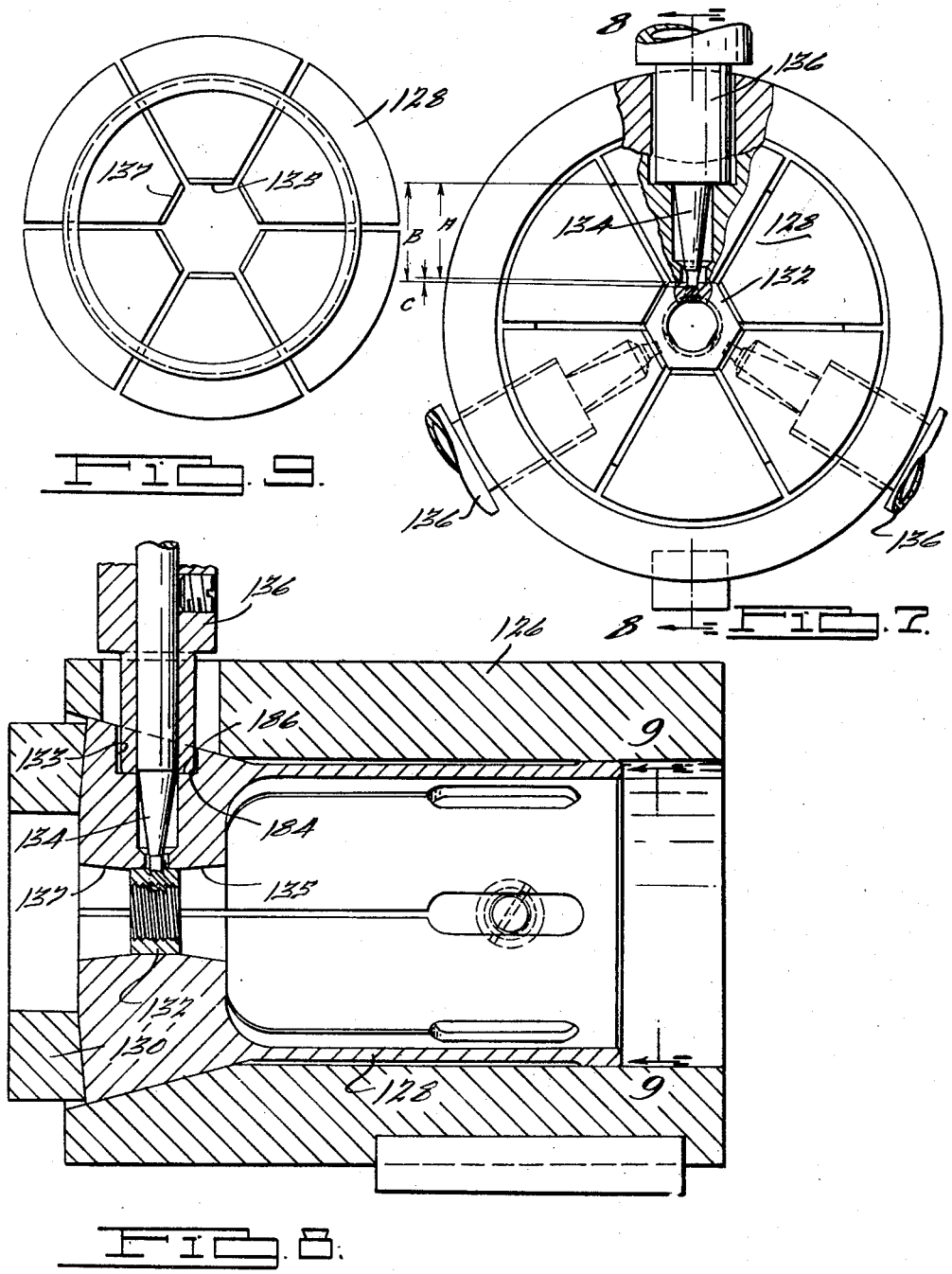

United States Patent Office 2,859,459
Patented Nov. 11, 1958

2,859,459

SELF-LOCKING NUTS HAVING RADIALLY DEFORMED THREAD PORTIONS

Albert Stoll, Detroit, Mich.

Application December 27, 1954, Serial No. 477,769

10 Claims. (Cl. 10—72)

This invention relates to methods and apparatus for making self-locking nuts and, more particularly, to an improved method for making self-locking nuts and the like and improved apparatus for performing the same.

An object of the invention is to overcome disadvantages in prior methods and apparatus for making self-locking nuts and to provide an improved method and improved apparatus for making self-locking nuts.

Another object of the invention is to provide an improved method for making self-locking nuts which facilitates the quantity production of self-locking nuts with a minimum of equipment, time, labor and expense.

Another object of the invention is to provide an improved method for making self-locking nuts which reduces the number of operations required to make a self-locking nut.

Another object of the invention is to provide an improved method of making self-locking nuts which compensates for variations in external dimensions of the nut blanks.

Another object of the invention is to provide improved apparatus for making self-locking nuts which enable self-locking nuts to be produced automatically and with uniformity and precision.

Another object of the invention is to provide improved apparatus for making self-locking nuts that is economical to manufacture and assemble, durable, efficient and reliable in operation.

Another object of the invention is to provide improved apparatus for making self-locking nuts which incorporates improved means for compensating for varying dimensions of the nut blanks.

Another object of the invention is to provide improved apparatus for making self-locking nuts which incorporates improved means for controlling the operation thereof.

Still another object of the invention is to provide improved apparatus for making self-locking nuts which incorporates improved means for successively feeding the nut blanks therethrough.

Yet another object of the invention is to provide improved apparatus for making self-locking nuts which incorporates improved means for preventing the clogging or jamming of nut blanks in the apparatus during the operation thereof.

The above as well as other objects and advantages of the present invention will become apparent from the following description, the appended claims and the accompanying drawings wherein:

Fig. 2 is a front elevational view, with portions in section, of the apparatus illustrated in Fig. 1;

Fig. 3 is a sectional view of a portion of the structure illustrated in Fig. 2, taken on the line 3—3 thereof;

Fig. 4 is a projected plan view of the hopper means illustrated in Fig. 2;

Fig. 5 is an enlarged longitudinal sectional view of the collet assembly illustrated in Fig. 1, and showing the same in one operative position;

Fig. 7 is an enlarged front view of the collet assembly, with portions in section;

Fig. 8 is a longitudinal sectional view of the structure illustrated in Fig. 7, taken on the line 8—8 thereof;

Fig. 9 is a view of the nut exit end of the collet, taken on the line 9—9 of Fig. 8;

Fig. 10 is a fragmentary transverse sectional view of a lock nut made in accordance with the present invention;

Fig. 11 is a fragmentary longitudinal sectional view of the nut illustrated in Fig. 10; and Fig. 12 is a side elevational view of the nut illustrated in Fig. 10.

Figure 1:
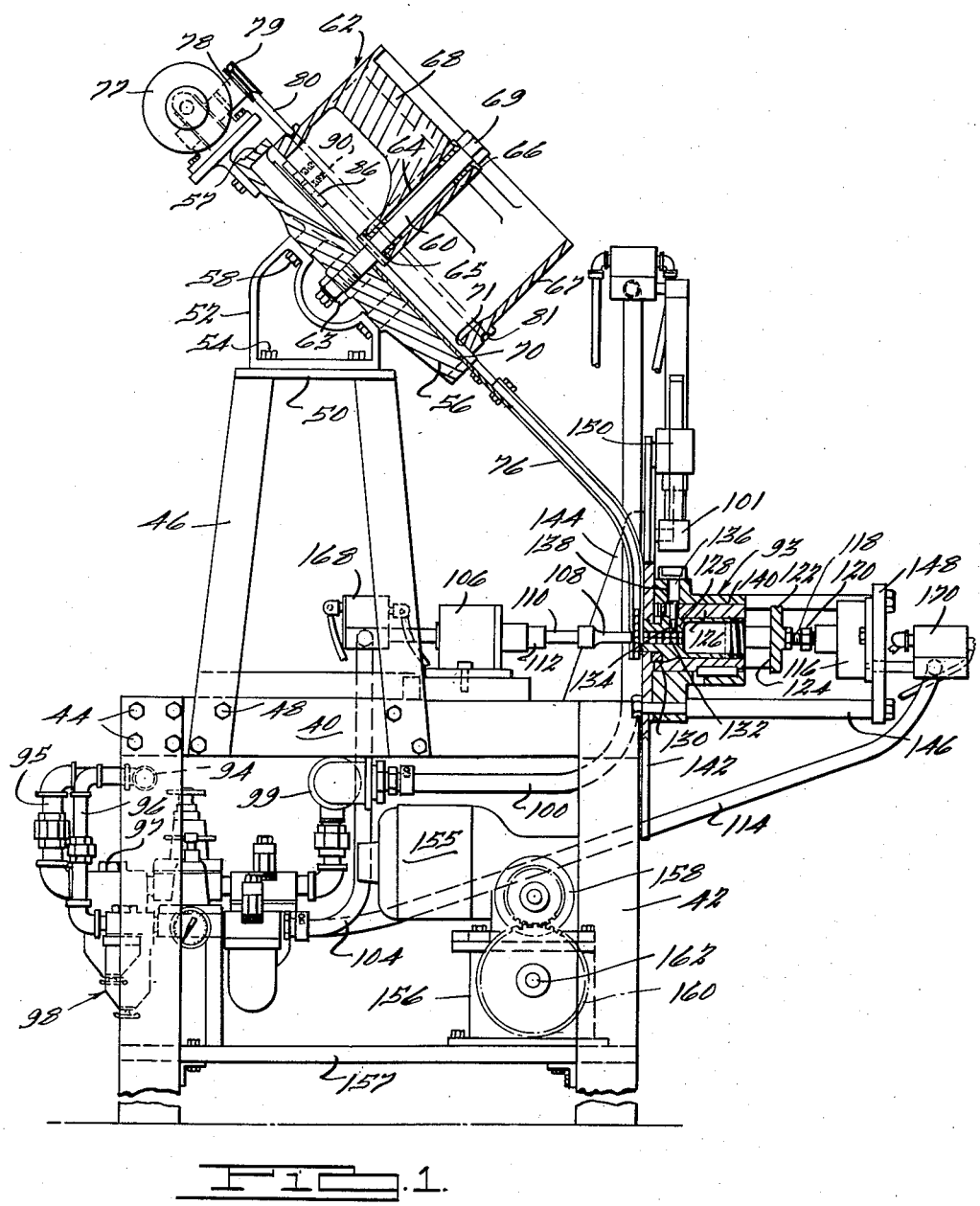
Figure 1 is a side elevational view, with portions in section, of apparatus embodying the present invention.

Referring to the drawings and, more particularly, to Figs. 10, 11 and 12, a self-locking nut, generally designated 20, is illustrated which may be of the type disclosed in the applicant's co-pending application, Serial No. 307,775, filed September 4, 1952, for Self-Locking Nut having A Radially Deformed Thread Portion and Method For The Production Of The Same, now U. S. Patent No. 2,754,871 issued July 17, 1956 and reference may be had thereto for a more complete description of the nut 20. In general, the nut 20 is comprised of a polygonally-shaped body 22 initially having an internally threaded substantially cylindrical bore 24. A protrusion or thread-lock island 26 is extruded from at least one of the side walls of the body 22, as for example, the wall 28. The protrusion or thread-lock island projects inwardly into the bore 24 of the nut intermediate the ends 30 and 32 thereof, the protrusion 26 being produced by indenting the side wall 34 of the nut, as at 36, so as to partially shear the metal of the side wall of the nut body 22. As disclosed in the above-mentioned application, a plurality of protrusions 26 may be provided, the protrusions 26 being circumferentially spaced from each other and the areas between the protrusions being equal to or greater than the area of the protrusions whereby space is provided into which metal may flow when the nut is applied to a bolt, thus preventing thread-galling or seizure. As pointed out in the above-mentioned application, when the nut 20 is applied to a mating threaded member, as for example, a bolt, the protrusions 26 and the walls from which the protrusions are extruded spring outwardly while the walls between the protrusions spring inwardly, thereby providing an elastic gripping force which securely locks the nut in the selected position and at the same time provides an oil and gas tight seal along the helical path of the threads.

The present invention provides an improved method and improved apparatus for making the nuts 20, although it will be understood that the present innvention is applicable to other uses.

In general, the method of making the self-locking nuts includes the steps of gripping the nut blank substantially the entire periphery thereof so as to prevent distortion of the nut blank, indenting a side wall of the nut blank so as to extrude thread-lock pads in the nut threads through such side wall in a direction substantially perpendicular to the side wall and spaced from the ends of the nut, the protrusion being limited to areas ranging between being equal to and less than the unaltered remaining space between the pads whereby the screw threaded portions adjacent the ends of the nut remain undisturbed and free-fitting upon mating bolt threads, and limiting the depth of the indentation independently of the outside dimension of the nut blank wall.

The present invention thus compensates for the variations of the outside diameter of the nut blanks, which, in practice, may be considerable. Since the depth of the indentations governs the extent of the radial extrusion of the nut screw threads, uniformity of nut screw thread-locking interference with the engaging screw thread is achieved, with the result that the lock nuts will provide prevailing torques within the desired tolerances.

Apparatus embodying the present invention is illustrated in Figs. 1 through 9 and is comprised of a base plate 40 which is supported by legs 42 secured to the corner portions of the base plate 40, as by bolts 44. Four upwardly extending support members 46 are provided, the lower end portions of which are secured to the base plate 40, as by bolts 48, while the upper ends of the support members 46 are secured to a horizontally extending plate 50. A supporting bracket 52 is mounted on the plate 50 and the supporting bracket 52 is fixed to the plate 50, as by bolts 54. An angularly disposed hopper base plate 56 having an upwardly projecting flange 57 extending partially around the periphery thereof is secured to the bracket 52, as by bolts 58, and the hopper base plate 56 carries an adjustable spindle 60 which extends in a direction substantially perpendicular to the plane of the plate 56 and which forms the axis for a hopper bowl, generally designated 62. In order that the spindle 60 may be adjusted in a longitudinal direction, the inner end portion of the spindle 60 is threadably mounted on the hopper base plate 56, a checknut 63 being provided to secure the spindle in the selected, adjusted position. The hopper 62 includes a hub portion 64 which is mounted for rotation on the spindle 60, the inner end of the hub portion bearing against an enlarged shoulder 65 provided on the spindle 60 and suitable bearings 66 being interposed between the spindle and the hub portion 64. The hub portion 64 is joined to the outer wall 67 of the hopper bowl 62 by integral radially extending spoke portions 68 and the hopper bowl is retained on the spindle by a suitable nut 69 which threadably engages the outer end portion of the spindle 60. A wear plate 70 is interposed between the base plate 56 and the lower edge 71 of the wall 67 of the hopper bowl 62, and the clearance between the wear plate 68 and the lower edge 71 of the wall 67 of the hopper bowl is adjusted by adjusting the position of the spindle 60 so as to permit nut blanks to pass through this gap only when lying flat.

The flange 57 prevents the nut blanks from passing out of the hopper bowl except through the gap between the lower edge 71 of the wall 67 and the wear plate 70. A pair of guide plates 72 and 73 are provided which are secured to the wear plate 70, as by screws 74. The guide plate 72 serves as an abutment stop for the nut blanks passing through the gap between the lower edge 71 of the wall 67 and the wear plate 70, and the guide plates 72 and 73 co-act to define a guideway 75 along which the nut blanks move to a chute 76. The hopper bowl 62 is rotated on the spindle 60 in a clockwise direction, as viewed in Fig. 4, by means of a conventional electric motor 77 having a conventional reducer drive 78 and a pulley 79 which drives an endless belt 80, the endless belt 80 passing around the hopper bowl 62 and being disposed in an annular groove 81 provided in the wall 67 of the hopper bowl. In order to maintain the required tension on the belt 80, an additional pulley 82 is provided which is journaled for rotation on one end of an arm 83, the opposite end of the arm 83 being pivotally connected to an outwardly projecting flange 84 provided on the base 56. The pulley 82 is biased by a coil spring 85, one end of which is secured to the arm 83 while the opposite end is secured to the motor mounting.

A plurality of nut blank agitators 86 are provided which are secured to the lower edge of the wall 67 of the hopper bowl. As shown in Fig. 4, each of the agitators 86 is generally triangular in plan view, the outer edge 87 of each agitator being arcuate and the curvature of the outer edge 87 being substantially the same as the curvature of the wall 67 of the hopper bowl. The leading edge 88 of each agitator 86 is also arcuate while the trailing edge 89 is substantially straight in the preferred embodiment illustrated. The agitators 86 lie in a plane substantially parallel to the plane of the wear plate 70 and are secured to the lower edge of the wall 67 of the hopper bowl, as by screws 90. With such a construction, the agitators 86 serve to induce the nut blanks to align themselves properly for entry into the space between the wear plate 70 and the lower edge 71 of the wall 67 of the hopper bowl 62 as the hopper bowl is rotated. At the same time, the agitators 86 perform a valve or gate-like action which permits the aligned nut blanks in an upper guideway 75 to flow out of such guideway unimpeded by nuts following the agitators in the bowl 62. Such a construction overcomes disadvantages of conventional hopper bowl agitators which merely serve to propel the nut blanks into the space between the wear plate and the bottom of the hopper bowl but do not prevent the nuts in the hopper bowl from jamming against the nuts aligned in the output guideway.

A generally U-shaped spring fender 92 is provided, one leg of which is secured to the wear plate 70 while the other leg serves to direct the excess nut blanks back into the hopper bowl for subsequent reissue through the gap between the wear plate 70 and the lower edge 71 of the wall 67 of the hopper bowl 62 as the hopper bowl is rotated. The upper end portion of the nut blank feed chute 76 communicates with the lower end of the guideway 75 while the lower end portion of the feed chute terminates adjacent a collet assembly, generally designated 93. The nuts enter the chute 76 from the guideway 75 and are moved downwardly in the chute 76 by the force of gravity to the output end of the chute 76 at the lower end thereof.

Referring to Figs. 1 and 2, a main air supply pipe 94 is provided from which auxiliary pipe lines 95 and 96 branch off. The lines 95 and 96 feed air under pressure through conventional filtering, pressure-regulating and lubricating units, generally designated 97 and 98. The regulating unit 97 feeds air via an enlarged pipe manifold 99 which also functions as a surge chamber through a suitable pipe 100 into air actuated impact hammers 101. The regulating unit 98 feeds air through an air line 104 to an air actuated piston and cylinder unit 106 which actuates a nut blank feeder bar 108 which serves to feed nut blanks in a regulated manner a controlled distance, the length of stroke of the piston rod 110 of the unit 106 being controlled by an adjusting collar 112 on the piston rod 110.

An air line 114 feeds air from the regulating unit 98 to a collet locking air actuated piston and cylinder unit 116 which actuates a threaded piston rod 118 provided with a length of stroke adjusting stop nut 120. The piston rod 118 is threadably connected to a yoke 122 having a nut exit opening 124 therein through which the completed nuts drop from the apparatus. The yoke 122 is secured to a collet locking sleeve 126 which applies pressure to a collet 128, and the collet sleeve is biased toward the retracted position by a coil spring 129 interposed between the collet 128 and the yoke 122. The collet 128 abuts against a collar 130 and functions to lock and securely grip a nut blank, such as 132, against distortion while the nut blank 132 is being subjected to an indenting operation of an indenting punch or punches, 134.

Figure 6:
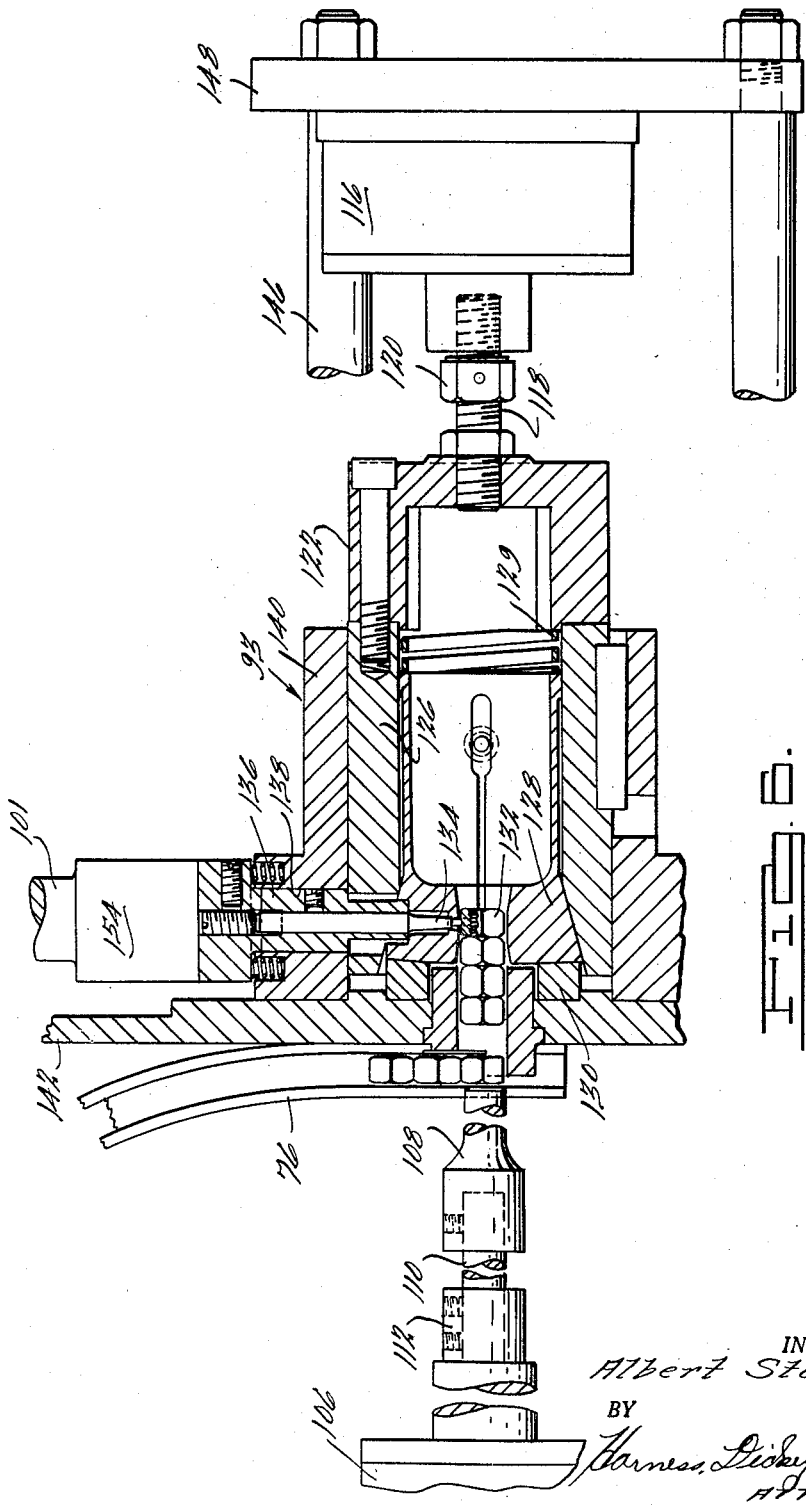
Fig. 6 is a view similar to Fig. 5 but showing the components in another operative position.

The hexagonal bore 135 of the collet 128 is provided with tapered lands 137 so as to assure that only the nut being indented will be subjected to the collet clamping pressure since a number of nut blanks are stacked in front of the feeder bar 108, as shown in Figs. 5 and 6, and assuming that the nuts vary in their outside dimensions, the tapered entry and exit portions of the collet bore function as a funnel and also function as a means for providing a reduced collet bore at the central or clamping portion to insure a clamping action on the nut being indented regardless of whether the adjacent nut is larger or smaller than the nut being clamped or indented. In order to prevent the nut which is fed into the working portion from passing entirely through the collet bore, the collet is sprung inwardly to an undersized diameter which is smaller than the outside diameter of the smallest nut blanks employed. With such a construction, the collet bore functions as a brake on the nut being fed into the working portion, thus preventing the unworked nut blank from passing entirely through the collet bore when it is fed into the collet bore.

The punches 134 project through counterbored passageways 133 in the head of the collet 128 and are held by punch holders 136 which are mounted for reciprocation in bores 138 defined by a collet housing block 140 and which are biased toward the retracted position by suitable coil springs 141 interposed between the housing block 140 and the punch holders 136. The block 140 is secured to a face plate 142 and the face plate 142, in turn, is secured to the base 40, suitable braces 144 being provided to strengthen the assembly. Projecting from and fastened to the face plate 142 and guide block 140 are three angularly spaced tie rods 146 which form the connecting means for a mounting plate 148 to which is attached the collet locking piston and cylinder unit 116.

The air actuated impact hammers 101 are mounted on the upper portion of the plate 142 by means of adjustable clamping blocks 150, the clamping blocks 150 being provided with slots 152 which permit increasing or decreasing the travel of the impact hammer heads 154 against the top of the punch holder 136 when imparting the necessary blow to drive the punch into the side of the nut wall to form the thread-locking islands or protrusions 26 which extend radially inwardly into the bore 24 of the nut 20.

Again referring to Fig. 1, a conventional electric motor 155 having a speed reducing unit 156 is provided which is mounted on a support member 157 secured to the legs 42 in spaced relationship with respect to the base 40. The speed reducing unit 156 includes speed change gears 158 and 160, the gear 160 being mounted on a cam shaft 162 supported by a housing 164. Assembled on the cam shaft 162 are timing cams 166 which control the operating sequence of a plurality of air cylinder actuating valves 168, 170, 172, 174 and 176. As shown in Fig. 3, the timing cams 166 lift valve push rods 178 which open and close air pilot valves 180. The air pilot valves 180 are connected to the main air valves 168, 170, 172, 174 and 176 by flexible tubes, such as 182, and form the pneumatic timing mechanism for operating the various air piston and cylinder units in a properly timed sequence.

In the operation of the apparatus, the piston and cylinder unit 106 initially actuates the nut blank feeder bar 108 and the nut blank feeder bar 108 pushes a nut blank to be indented into the proper position in the hexagonal collet bore 135 under the indenting punch while the collet is unlocked, as shown in Fig. 5. While the nut feeder bar is at rest in the forward position, as shown in Fig. 5, the collet locking piston and cylinder unit 116 advances the collet clamping sleeve 126 to cause the collet 128 to firmly grip the nut to be indented, as shown in Fig. 6, whereupon the nut feeder bar 108 is retracted, as shown in Fig. 6, to permit a new nut blank to fall into the feeding position at the bottom of the feed chute 76. At the same time, the heads 154 of the impact hammers 101 are brought to bear on top of the punch holders 136, as shown in Fig. 6, driving the end of the indenting punch into the nut side wall. The depth of the indentation is governed by the stop surface 184 in the collet and the end face 186 of the punch holder 136. The impact hammers are then retracted, as shown in Fig. 5, and the collet locking sleeve 126 is also retracted. The nut feed bar 108 then moves forward and a new nut blank is inserted, the finished indented nut being ejected, as at 188, by the incoming nut blank. Since the sequence of operations is controlled by the cams 166 mounted on the rotating cam shaft 162, one nut is indented for each revolution of the cam shaft 162.

Referring to Fig. 7, three dimensions are shown: A equals the distance from the inside of the collet bore 135 to the bottom of the counterbore in the passageway 133 in the collet head; B equals the distance from the tip of the indenting punch 134 to the end face of the punch holder 136; and C equals the difference between A and B and also equals the depth of the indentation in the side wall of the nut. Since the dimensions A and B are constant, according to the adjustment selected for the dimension B, the variations of the outside diameter of the nut, which, in practice, may be considerable, have substantially no effect on the uniformity of the depth of the indentations in the side wall of the nut. Since the depth of the indentations governs the extent of the radial extrusion of the nut screw threads at this point into the nut thread bore, uniformity of nut screw thread locking pad interferences with the engaging screw thread is achieved thereby providing a lock nut which will provide prevailing torques within the desired tolerances.

While a preferred embodiment of the invention has been shown and described, it will be understood that various changes and modifications may be made without departing from the spirit of the invention.

What is claimed is:

1. Apparatus for making self-locking nuts and the like comprising, in combination, a supporting structure, self-adjusting means carried by said supporting structure for gripping a nut blank around substantially the entire periphery thereof, extruding punch means actuatable to engage the side walls of a nut blank intermediate the ends thereof when said nut blank is held in said gripping means, and stop means carried by said gripping means and limiting the travel of said extruding punch means independently of the outside dimension of said nut blank.

2. Apparatus for making self-locking nuts and the like comprising, in combination, a supporting structure, self-adjusting gripping means carried by said supporting structure, said gripping means defining a bore adapted to receive a workpiece and a radially extending passageway communicating with said bore, extruding punch means disposed in said radial passageway and actuatable to engage the side walls of a workpiece in said bore, and stop means carried by said gripping means and limiting the travel of said extruding punch means independently of said workpiece.

3. In a device for making self-locking nuts, the combination comprising adjustable holding means adapted to grip a nut blank around substantially the entire periphery thereof, means for successively feeding nut blanks into said holding means, extruding punch means carried by said holding means and actuatable to engage the side wall of a nut blank, and stop means on said holding means limiting the travel of said extruding punch means.

4. Apparatus for making self-locking nuts comprising, in combination, a collet defining a bore adapted to receive a nut blank and a radially extending passageway communicating with said bore, means for successively feeding nut blanks into said bore, stop means limiting the movement of said nut blanks in said bore, reciprocating means including an extruding punch slidably mounted in said radial passageway and actuatable to engage the side wall of a nut blank in said bore, and stop means on said collet limiting the travel of said extruding punch through said side wall to a distance less than the thickness of said side wall.

5. Apparatus for making self-locking nuts comprising, in combination, a supporting structure, a collet carried by said supporting structure, said collet means defining a bore adapted to receive a nut blank and a plurality of angularly spaced radially extending passageways communicating with said bore, means for successively feeding nut blanks into said bore, stop means limiting the movement of said nut blanks in said bore, a plurality of extruding punches, one of said punches being slidably mounted in each of said passageways and being actuatable to engage a side wall of a nut blank in said bore, and means including a plurality of abutment surfaces on said collet means for limiting the travel of said extruding punches through said side walls to a distance less than the thickness of said side walls.

6. Apparatus for making self-locking nuts including, in combination, a supporting structure, collet means carried by said supporting structure and defining a bore adapted to receive a nut blank, said collet means also defining a plurality of passageways intersecting said bore means for successively feeding nut blanks into said bore, reciprocating extruding punch means in each of said passageways actuatable to engage a side wall of a nut blank in said bore, and stop means intermediate the ends of each of said passageways for limiting the movement of said extruding punch means through said side walls of a nut blank to a distance less than the thickness of said side walls.

7. Apparatus for making self-locking nuts comprising, in combination, a supporting structure, hopper means carried by said supporting structure, guide means communicating with said hopper means and defining a guideway adapted to accommodate nut blanks for longitudinal movement along a predetermined path, a collet defining a bore and a radially extending passageway communicating with said bore, an extruding punch mounted in said passageway for reciprocating movement in a direction substantially perpendicular to the longitudinal axis of said bore and actuatable to engage the side wall of a nut blank in said bore, fluid means for actuating said extruding punch, means for successively feeding nut blanks into said bore from said guideway, and means on said collet limiting the travel of said punch through said side wall to a distance less than the thickness of said side wall.

8. Apparatus for making self-locking nuts comprising, in combination, a supporting structure, hopper means carried by said supporting structure, guide means communicating with said hopper means and defining a guideway adapted to accommodate nut blanks for longitudinal movement along a predetermined path, a collet defining a bore and a radially extending passageway communicating with said bore, an extruding punch mounted in said passageway for reciprocating movement in a direction substantially perpendicular to the longitudinal axis of said bore and actuatable to engage a side wall of a nut blank in said bore, fluid means for actuating said punch, means for successively feeding nut blanks into said bore from said guideway, means limiting the movement of said nut blanks in said bore, and abutment means on said collet intermediate the ends of said passageway limiting the travel of said punch through said side wall to a distance less than the thickness of said side wall.

9. In apparatus for making self-locking nuts, the combination including a supporting structure, a hopper carried by said supporting structure and adapted to receive a plurality of nut blanks, guide means communicating with said hopper means and adapted to support said nut blanks for sliding movement along a predetermined path, means including a plurality of generally triangularly-shaped gates for regulating the flow and successively feeding said nut blanks from said hopper into said guide means, a collet defining a bore and a radially extending passageway communicating with said bore, an extruding punch mounted in said passageway for reciprocating movement and actuatable to engage the side walls of a nut blank in said bore, means including cylinder and piston means for successively feeding workpieces into said bore from said guide means, means including cylinder and piston means for opening and closing said collet, and means on said collet intermediate the ends of said passageway limiting the travel of said extruding punch through said side walls to a distance less than the thickness of said side walls.

10. In a device for making self-locking nuts, the combination comprising a supporting structure, a hopper rotatably mounted on said supporting structure and adapted to receive a plurality of nut blanks, guide means communicating with said hopper and adapted to receive a plurality of nut blanks for sliding movement along a predetermined path, a plurality of generally triangularly-shaped gates fixed to said hopper and adapted to regulate the feed of said nut blanks from said hopper into said guide means, a collet defining a bore and a plurality of passageways extending radially of said bore and communicating therewith, a plurality of extruding punches, one of said extruding punches mounted in each of said passageways for reciprocating movement and actuatable to engage a side wall of a nut blank in said bore, means including fluid actuated cylinder and piston means for successively feeding nut blanks into said bore from said guide means, means including additional fluid actuated cylinder and piston means for opening and closing said collet, means including a plurality of cams for controlling said cylinder and piston means, and means on said collet intermediate the ends of said passageways limiting the travel of said extruding punches through said side walls to a distance less than the thickness of said side walls.

References Cited in the file of this patent

UNITED STATES PATENTS

| Number | Name | Date |
|---|---|---|
| 441,388 | Bray | Nov. 25, 1890 |
| 531,001 | Muslar | Dec. 18, 1894 |
| 1,903,922 | Rupf | Apr. 18, 1933 |
| 2,224,079 | Henry | Dec. 3, 1940 |
| 2,385,004 | Kittess | Sept. 18, 1945 |
| 2,385,521 | Mead | Sept. 25, 1945 |
| 2,440,080 | Eck | Apr. 20, 1948 |
| 2,462,603 | Boots | Feb. 22, 1949 |
| 2,464,410 | Neff | Mar. 15, 1949 |
| 2,644,964 | MacKintosh | July 14, 1953 |
| 2,686,546 | MacLean | Aug. 17, 1954 |
| 2,722,698 | Green | Nov. 8, 1955 |
| 2,754,871 | Stoll | July 17, 1956 |